(12) United States Patent
Tuggle

(10) Patent No.: US 6,185,837 B1
(45) Date of Patent: Feb. 13, 2001

(54) ANTI-TORSION DRYER CONNECTION

(75) Inventor: W. Gregory Tuggle, Spring Lake, MI (US)

(73) Assignee: Builder's Best, Inc., Jacksonville, TX (US)

(*) Notice: Under 35 U.S.C. 154(b), the term of this patent shall be extended for 0 days.

(21) Appl. No.: 09/283,520

(22) Filed: Apr. 1, 1999

Related U.S. Application Data

(60) Provisional application No. 60/080,675, filed on Apr. 3, 1998.

(51) Int. Cl.[7] .................................................. F26B 11/02
(52) U.S. Cl. .......................... 34/134; 34/138; 34/140; 34/235; 285/183
(58) Field of Search .......................... 34/134, 138, 140, 34/175, 235; 285/168, 181, 182, 183; 454/243, 270, 367, 903

(56) References Cited

U.S. PATENT DOCUMENTS

| | | | |
|---|---|---|---|
| 5,133,579 | * 7/1992 | Anderson et al. | 285/226 |
| 5,957,506 | * 9/1999 | Stepp | 285/183 |

* cited by examiner

Primary Examiner—Pamela Wilson
(74) Attorney, Agent, or Firm—Rader, Fishman, Grauer & McGarry an office of Rader, Fishman & Grauer

(57) ABSTRACT

A vent system has a rotatable connection between flexible conduits, which carry heated air from the dryer to an external location, such as the atmosphere. The vent system consists of a swivel coupler rotatably connecting a pair of flexible exhaust conduits, one of which is readily attachable to a dryer exhaust outlet, which discharges exhaust air from the dryer, and the other of which is readily attachable to an outlet pipe, which carries exhaust air from the flexible exhaust conduit through a wall and to the atmosphere. Each flexible exhaust conduit, which is laterally flexible and axially extensible, includes a segmented elbow allowing bending up to approximately a right angle in one direction. The swivel coupler includes a rotatable joint wherein an annular extension on one half of the connector travels in an annular indentation in the other half so as to enable rotation therebetween.

8 Claims, 2 Drawing Sheets

ANTI-TORSION DRYER CONNECTION

CROSS-REFERENCE TO RELATED APPLICATIONS

This application claims the benefit of U.S. Provisional Application Ser. No. 60/080,675, filed Apr. 3, 1998.

BACKGROUND OF THE INVENTION

1. Field of the Invention

The invention relates to a dryer vent exhaust duct system, and, more specifically, to an anti-torsion dryer connection that relieves the torsional forces created during installation.

2. Description of the Related Art

Dryer vent connections are well known and are used to connect the exhaust vent from a typical household clothes dryer to an exterior exhaust vent positioned on the outside of a home or building. A flexible duct is typically used to connect the dryer exhaust vent to the exterior vent. A common type of flexible duct is a corrugated metal duct capable of axial extension. Elbows and/or sleeve couplers are often mounted to the ends of the flexible duct. One disadvantage of using corrugated metal duct is that it becomes loaded with torsional forces as it is extended to meet the normally tortuous path from the clothes dryer to the exterior vent.

One solution to the build-up of torsional forces is to provide the end of the flexible duct with elbow connectors that swivel relative to the duct. Thus, any twisting of the duct imparted by torsional forces due to axial extension is compensated by the rotation of the sleeve relative to the elbow. Depending on the length of the duct run, it has been helpful to provide an elbow with a swivel sleeve connection at both ends of the duct. However, the dual elbow solution is not suitable for every installation. For example, depending on the location of the exterior duct, it may not be possible to mate an elbow to the exterior duct because of space limitations. Additionally, the extra elbow is relatively expensive compared to the total cost of the duct.

SUMMARY OF THE INVENTION

The invention overcomes the disadvantage of the dual elbow swiveled connection by providing an anti-torsion dryer connection having a flexible duct with an inline swivel connection. An elbow is connected to one end of the flexible duct and a sleeve is connected to the other end of the flexible duct. The swivel sleeve is positioned inline with the flexible duct to relieve the build-up of torsional forces on the flexible duct. Preferably, the inline swivel sleeve is placed, relative to the duct, away from the connection between the duct and the end sleeve and the duct and the elbow.

BRIEF DESCRIPTION OF THE DRAWINGS

The invention will now be described with reference to the drawings in which.

DETAILED DESCRIPTION OF THE PREFERRED EMBODIMENTS

Figure 1:
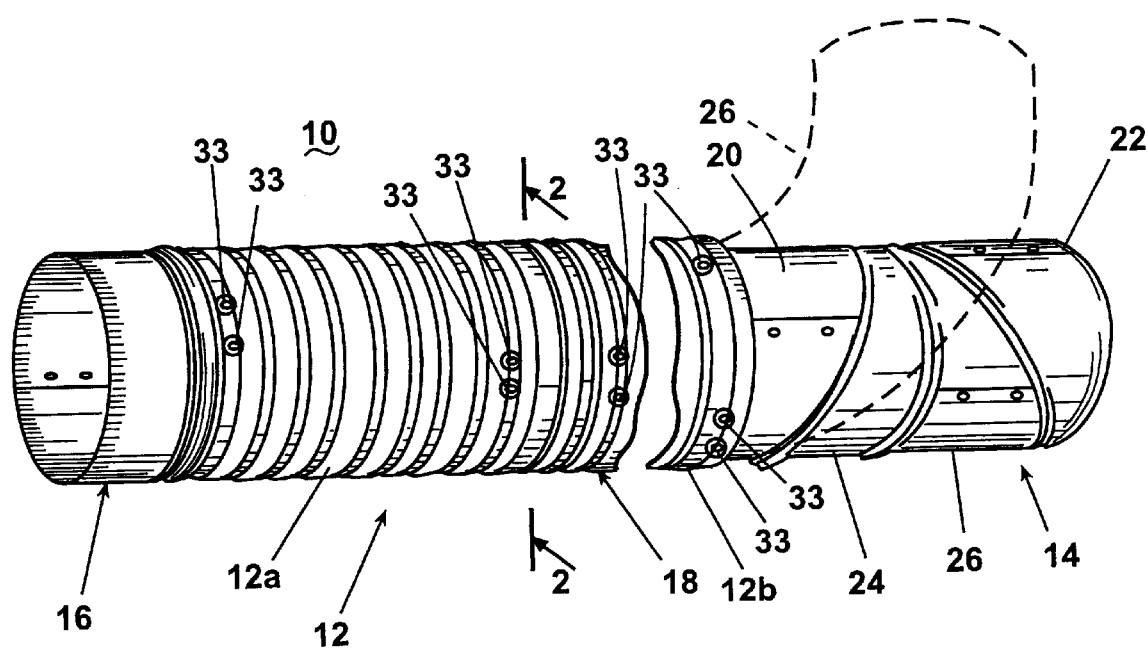
FIG. 1 illustrates a first embodiment anti-torsion dryer connection including a flexible duct with a swivel connection according to the invention.

FIG. 1 illustrates an anti-rotation dryer connection 10 according to the invention and comprises a flexible duct 12 having opposing ends, an elbow 14 mounted to one of the ends of the flexible duct, and a sleeve coupler 16 mounted to the other end of the flexible duct. A swivel connection 18 is provided inline of the flexible duct 12 and, effectively dividing the flexible duct 12 into a first portion 12a and a second portion 12b. The swivel connection effective permits the elbow 14 to swivel relative to the sleeve coupler 16.

Preferably, the flexible duct 12 is made from corrugated metal that is capable of axial expansion. One or both flexible duct portions 12a, 12b can be made of a heavy corrugated metal that can be shaped and will hold its shape against the magnitude of forces typically encountered during and after installation. For example, one of the conduit portions could be bent in a shape that will bypass an obstacle in the path of the conduit. The conduit portion could also be bent into a 90° turn or any other desired angle.

The elbow 14 is an articulated elbow comprising end segments 20 and 22 and middle segments 24 and 26. The end segments 20 and 22 are rotatably connected to the adjacent middle segments 24 and 26. Similarly, the middle segments 24 and 26 are rotatably connected. Thus, the end segment 20 can rotate relative to the end segment 22.

The elbow 14 and the sleeve coupler 16 are non-rotatably mounted to the ends of the flexible duct 12. The sleeve coupler 16 and elbow 14 are well known and made from a sheet metal such as aluminum.

Figure 2:
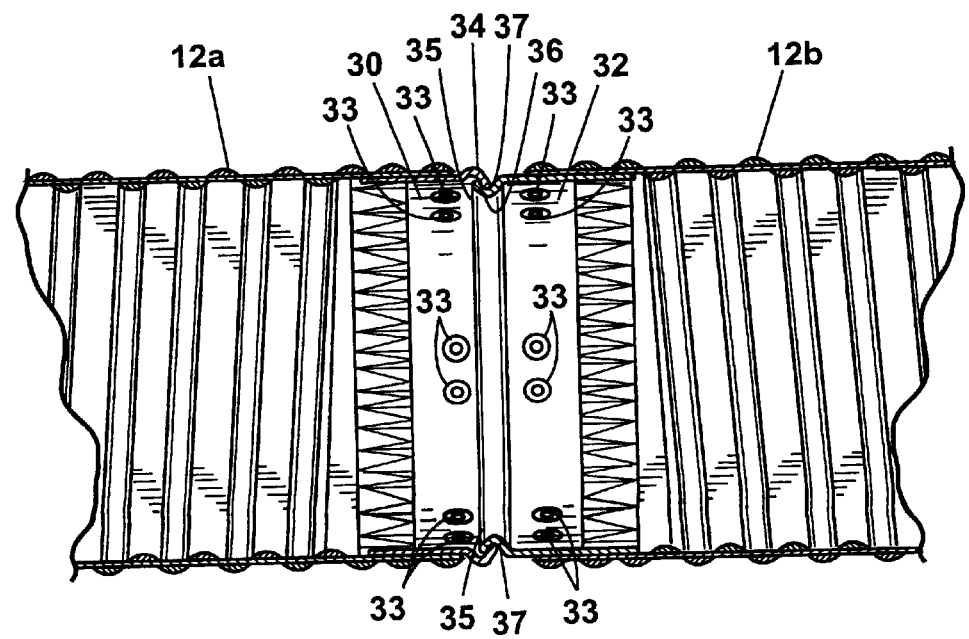
FIG. 2 is a sectional view of the swivel connection of FIG. 1.

Referring to FIG. 2, the swivel connection 18 is shown in greater detail and comprises a first collar 30 and a second collar 32. The first and second collars 30, 32 are telescopically received within the interior of the corresponding conduit portions 12a, 12b and secured thereto by traditional fasteners 33, such as rivets, to form a telescopic connection between the corresponding collar and conduit portion. A first annular flange 34, with an arcuate cross section defining an angular extension, extends from the collar 30 and a second annular flange 36, with an arcuate cross section defining an angular indentation 37, extends from the second collar 32 and overlies the first flange. The annular extension 35 is received within the annular indentation 37 to rotatably connect to collars 30, 32. The conduit portion 12a is fixedly attached to the first collar 30 and the second conduit portion 12b is fixedly attached to the second collar 32. The first and second collars 30, 32 can rotate relative to each other about the flanges 34, 36. Thus, the conduit 12a can rotate relative to conduit 12b, effectively permitting the elbow to rotate relative to the sleeve coupler.

To assemble the anti-torsion dryer connection 10, the end segment 22 is fitted to the exhaust vent (not shown) of a typical household clothes dryer. The flexible duct 12 is then run along the necessary path to the exterior vent (not shown). The sleeve coupler 16 is then secured to the exterior vent. Preferably, the end segment 22 is received over the dryer exhaust vent to prevent the creation of an edge surface against which lint and other particles entrained in the dryer exhaust air could accumulate. Similarly, the sleeve coupler 16 is received inside the exterior vent to prevent the creation of an edge against which lint and other dust particles could accumulate.

During the installation, the path taken by the flexible conduit 12 can require the conduit to form many corners or turns and twist. The twisting and turning of the conduit results in a rotation of the first conduit portion 12a and the second conduit portion 12b at the swivel connection 18 to relieve the flexible conduit 12 of any torsional forces. Without the swivel connection 18, the torsional forces would build-up in the flexible conduit, greatly hindering installation.

It should be noted that the articulated elbow 14 can rotate in response to the torsional forces and does provide some relief for the torsional forces. However, the relief of the torsional forces is minimal because of the sector-shaped geometry of the different elbow segments, which prevents the relative free rotation of the elbow segments.

Figure 3:
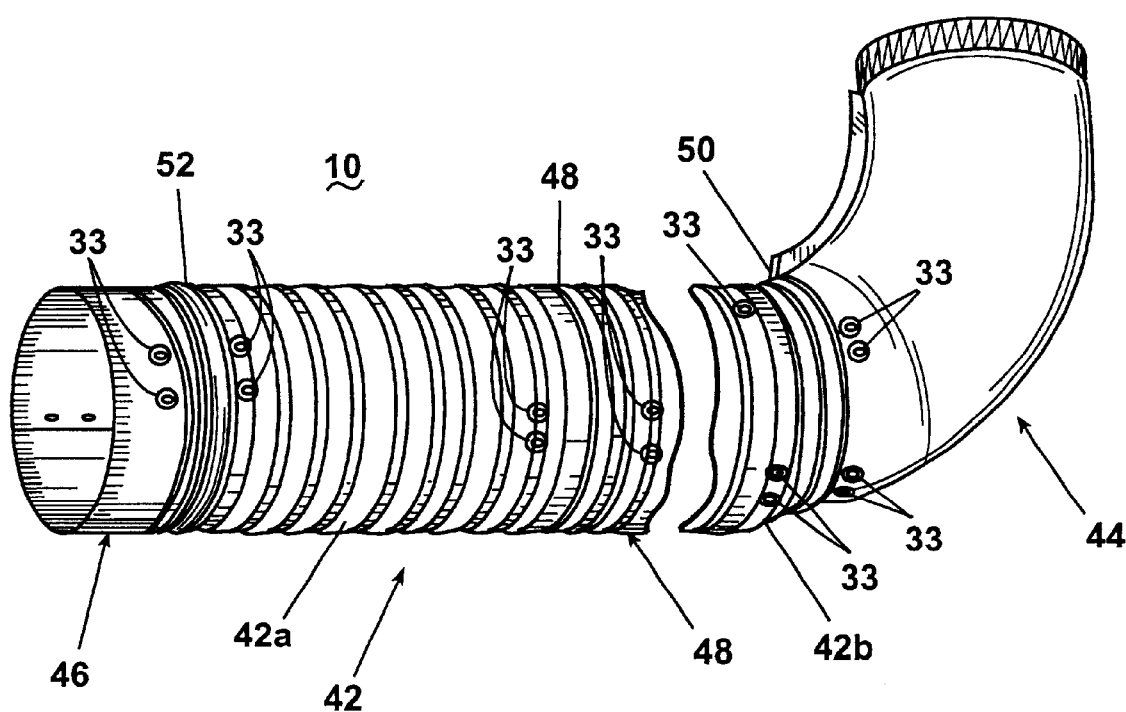
FIG. 3 illustrates a second embodiment of the swiveled dryer connection according to the invention.

FIG. 3 illustrates a second embodiment of the anti-rotation dryer connection 40 that comprises a flexible conduit 42 having opposing ends, an elbow 44 mounted to one end of the flexible conduit 42, and a sleeve coupler 46 mounted to the other end of the flexible conduit. An inline swivel connection 48 is provided in the conduit 42 and effectively separates the conduit 42 into a first portion 42*a* and a second portion 42*b*.

The elbow 44 is a non-articulating elbow, whose construction is well known. Similarly, the sleeve coupler is also well known.

In the second embodiment, the elbow 44 and the sleeve coupler 46 are connected to the ends of the flexible conduit 42 by swivel connections 50 and 52, respectively. The swivel connections 50 and 52 provide torsional relief in addition to the inline swivel connection 48.

The installation of the second embodiment swivel connection 40 is similar to that described for the first embodiment. The operation of the second embodiment swivel connection 40 is also similar to the first embodiment. The only difference is that the swivel connections 50 and 52 of the second embodiment provide additional torsion relief than what can be obtained with just the inline swivel connection.

It should be noted that the flexible conduit with the inline swivel connection can be combined with any type and combination of elbow or sleeve coupler. For example, the flexible conduit with the inline swivel connection could have elbows on both ends, with both elbows being articulated elbows or traditional elbows with swivel connections, or one elbow could be an articulated elbow and the other elbow could be a swively connected elbow. Each end of the conduit could mount a standard sleeve connector and one or both of the standard sleeve connectors could be swively connected to the flexible conduit. Also, the different elbows and sleeve couplers can be mixed as needed. Additionally although only one inline swivel is shown it is within the scope of the invention for multiple inline swivel connections can be provided in the flexible duct.

The swiveled dryer connection according to the invention also can be used to connect the dryer to other conduits and not just an exterior vent. Additionally, the flexible conduit with the inline swivel could be used to connect other conduit segments and not directly connect to the dryer exhaust vent.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

What is claimed is:

1. A dryer vent exhaust duct system for venting dryer exhaust air from a dryer vent of a clothes dryer to an exhaust vent, comprising:

a flexible duct having a first portion with a first end and a second portion with a second end, said first end for connecting to the dryer vent and said second end being adapted to connect to an exhaust vent; and a swivel coupler connecting the first and second portions to each other, intermediate the first and second ends wherein the first and second portions can rotate relative to one another;

whereby when the first end is connected to the dryer vent and the second end is connected to the exhaust vent, the swivel coupler will relieve torsional forces in the flexible duct caused by movement of the dryer vent relative to the exhaust vent.

2. The dryer venting system of claim 1, wherein said swivel coupler comprises:

a first cylindrical connector having an annular indentation at a first end;

a second cylindrical connector having an annular extension at a first end, wherein said annual extension engages with said annular indentation to secure said first and second cylindrical connectors together in a rotatable fashion, wherein the first and second portions are connected to a second end of said first cylindrical connector and a second end of said second cylindrical connector of said swivel coupler, respectively.

3. The dryer venting system of claim 2, wherein said first and second portions are telescopically connected to said first and second cylindrical connectors of said swivel coupler, respectively, in a non-rotatable fashion.

4. The dryer venting system of claim 2, wherein said first and second portions are non-removably attached to said first and second cylindrical connectors of said swivel coupler, respectively.

5. The dryer venting system of claim 1, wherein an elbow connector is connected to one of the first and second ends.

6. The dryer venting system of claim 1, wherein a first elbow connector is connected to the first end a second elbow connector is connected to the second end.

7. The dryer venting system of claim 6, wherein at least one of said first and second elbow connectors is a segmented elbow.

8. The dryer venting system of claim 4, further comprising fasteners for non-removably attaching said first and second portions to said swivel coupler.

* * * * *